United States Patent
Teyeb et al.

(10) Patent No.: US 11,412,423 B2
(45) Date of Patent: Aug. 9, 2022

(54) FULL RRC CONFIGURATION IN EN-DC

(71) Applicant: TELEFONAKTIEBOLAGET LM ERICSSON (PUBL), Stockholm (SE)

(72) Inventors: Oumer Teyeb, Solna (SE); Riikka Susitaival, Helsinki (FI); Gunnar Mildh, Sollentuna (SE); Henning Wiemann, Aachen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/757,933

(22) PCT Filed: Nov. 16, 2018

(86) PCT No.: PCT/IB2018/059044
§ 371 (c)(1),
(2) Date: Apr. 21, 2020

(87) PCT Pub. No.: WO2019/097470
PCT Pub. Date: May 23, 2019

(65) Prior Publication Data
US 2021/0219193 A1    Jul. 15, 2021

Related U.S. Application Data

(60) Provisional application No. 62/587,171, filed on Nov. 16, 2017.

(51) Int. Cl.
*H04W 36/00* (2009.01)
*H04W 76/30* (2018.01)
(Continued)

(52) U.S. Cl.
CPC ... *H04W 36/0069* (2018.08); *H04W 36/0033* (2013.01); *H04W 36/0072* (2013.01);
(Continued)

(58) Field of Classification Search
CPC ..... H04W 76/27; H04W 76/15; H04W 76/19; H04W 36/0069; H04W 36/08;
(Continued)

(56) References Cited

U.S. PATENT DOCUMENTS

2015/0208235 A1   7/2015 Ingale et al.
2016/0165499 A1   6/2016 Xu et al.
(Continued)

FOREIGN PATENT DOCUMENTS

CN    101287278 A    10/2008
CN    104936163 A    9/2015
(Continued)

OTHER PUBLICATIONS

ZTE Corporation, "Consideration on SN change in LTE/NR tight interworking", 3GPP TSG-RAN WG2#NR_AdHoc#2, Qingdao, China, Jun. 27-29, 2017, pp. 1-10, R2-1707384, 3GPP.
(Continued)

*Primary Examiner* — Nam T Huynh

(57) ABSTRACT

Methods, systems and network devices for operating a network node to provide dual connectivity in a handover of a user equipment, UE, in a new radio telecommunications system are provided. Methods include sending, from the network node and to a target secondary node, an addition request message to allocate resources for the UE in the handover. Operations include receiving an addition request acknowledgement message from the target secondary node. The addition request acknowledgement message includes a context indication regarding a full radio resource control, RRC, context or a delta RRC context. The delta RRC context includes data that is updated relative to data in a current UE context. Operations include determining, based on context indication, a type of RRC context to provide to the target secondary node.

6 Claims, 15 Drawing Sheets

(51) Int. Cl.
*H04W 76/27* (2018.01)
*H04W 92/20* (2009.01)
*H04W 76/15* (2018.01)

(52) U.S. Cl.
CPC ........... *H04W 76/27* (2018.02); *H04W 76/30* (2018.02); *H04W 76/15* (2018.02); *H04W 92/20* (2013.01)

(58) Field of Classification Search
CPC ......... H04W 36/0033; H04W 36/0072; H04W 76/30; H04W 92/20; H04W 88/06
See application file for complete search history.

(56) References Cited

U.S. PATENT DOCUMENTS

| | | | |
|---|---|---|---|
| 2016/0242080 A1 | 8/2016 | Vikberg et al. | |
| 2017/0222876 A1 | 8/2017 | Van Der Velde et al. | |
| 2017/0318505 A1 | 11/2017 | Park et al. | |
| 2018/0359800 A1* | 12/2018 | Wu ...................... | H04W 76/27 |

FOREIGN PATENT DOCUMENTS

| | | |
|---|---|---|
| CN | 105451364 A | 3/2016 |
| CN | 107113671 A | 8/2017 |
| CN | 107113904 A | 8/2017 |
| EP | 2983407 A1 | 2/2016 |
| JP | 2017505057 A | 2/2017 |
| KR | 20140133232 A | 11/2014 |
| WO | 20150470511 A1 | 4/2015 |
| WO | 2015115034 A1 | 8/2015 |

OTHER PUBLICATIONS

Ericsson, "Full configuration in EN-DC", 3GPP TSG-RAN WG2 #100, Reno, Nevada, Nov. 1-Dec. 1, 2017, pp. 1-6, R2-1713390, 3GPP.

HTC et al., "Support of full configuration per CG", 3GPP TSG-RAN WG2#99bis, Prague, Czech Republic, Oct. 9-13, 2017, pp. 1-6, R2-1711666, 3GPP.

3rd Generation Partnership Project, "3rd Generation Partnership Project; Technical Specification Group Radio Access Network; Evolved Universal Terrestrial Radio Access (E-UTRA) and NR; Multi-connectivity; Stage 2 (Release 15)", Technical Specification, 3GPP TS 37.340 V1.2.0, pp. 1-50, Oct. 2017, 3GPP, France.

Ericsson et al., "Addition of the full config indicator", 3GPP TSG-RAN Meeting #80, La Jolla, CA, USA, Jun. 11-14, 2018, pp. 1-28, Change Request RP-181410, 3GPP.

Ericsson, "[TP for BL CR 37.340]", 3GPP TSG-RAN WG3 Meeting #102, Spokane, WA, U.S., Nov. 12-16, 2018, pp. 1-10, R3-186921, 3GPP.

ZTE, "(TP for NR BL CR for TS 37.340): Consideration on the usage of SN UE X2AP ID IE during inter-MN without SN change", 3GPP TSG-RAN WG3 #101, Gothenburg, Sweden, Aug. 20-24, 2018, pp. 1-4, R3-184557, 3GPP.

Huawei, "Detailed procedure of Secondary Node change", 3GPP TSG RAN WG3 Meeting #96, Hangzhou, China, May 15-19, 2017, pp. 1-3, R3-171869, 3GPP.

Ericsson, "Conditional Handover", 3GPP TSG-RAN WG2 #99-bis on NR, Prague, Czech, Oct. 9-13, 2017, pp. 1-5, R2-1710850, 3GPP, France.

* cited by examiner

FULL RRC CONFIGURATION IN EN-DC

RELATED APPLICATIONS

The present application is a 371 of International Application No. PCT/IB2018/059044, filed Nov. 16, 2018, which claims the benefit of and priority to U.S. Provisional Patent Application No. 62/587,171, filed Nov. 16, 2017, entitled "FULL RRC CONFIGURATION IN EN-DC," the disclosures of which are hereby incorporated herein by reference in their entirety.

TECHNICAL FIELD

The present disclosure relates to methods and operations by network nodes and application servers in a communications system for controlling connectivity of user equipments.

BACKGROUND

In LTE, a Radio Resource Control (RRC) protocol is used to configure/set up and maintain the radio connection between the user equipment (UE) and the eNB. When the UE receives an RRC message from the eNB, it will apply or compile the configuration, and if this succeeds the UE generates an RRC complete message that indicates the transaction ID of the message that triggered this response.

In recent releases of LTE, three Signaling Radio Bearers (SRBs), namely SRB0, SRB1 and SRB2 have been available for the transport of RRC and Non Access Stratum (NAS) messages between the UE and eNB. A new SRB, known as SRB1bis, has also been introduced for supporting DoNAS (Data Over NAS) in NB-IoT.

SRB0 may be used for RRC messages using the CCCH logical channel, and may be used for handling RRC connection setup, RRC connection resume and RRC connection re-establishment. Once the UE is connected to the eNB (i.e. RRC connection setup or RRC connection reestablishment/resume has succeeded), SRB1 may be used for handling RRC messages (which may include a piggybacked NAS message) as well as for NAS messages prior to the establishment of SRB2, all using the DCCH logical channel.

SRB2 may be used for RRC messages that include logged measurement information as well as for NAS messages, all using the DCCH logical channel. SRB2 may have a lower priority than SRB1, because logged measurement information and NAS messages can be lengthy and could cause the blocking of more urgent and smaller SRB1 messages. SRB2 may be configured by E-UTRAN after security activation.

SUMMARY

Some embodiments described herein include methods of operating a network node to provide dual connectivity in a handover of a user equipment, UE, in a new radio telecommunications system. Methods may include sending, from the network node and to a target secondary node, an addition request message to allocate resources for the UE in the handover. Operations include receiving an addition request acknowledgement message from the target secondary node, wherein the addition request acknowledgement message comprises a context indication regarding a full radio resource control, RRC, context or a delta RRC context, and wherein the delta RRC context comprises data that is updated relative to data in a current UE context. Operations may include, based on the received context indication, sending, from the network node, a message to the UE including the context indication. Responsive to the context indication comprising a full RRC context, the message sent to the UE includes a flag to release a previous EN-DC configuration and add the full RRC context to the UE. Responsive to the context indication comprising a delta RRC context, the message that includes the flag is not sent to the UE.

Some embodiments are directed to a network node for providing dual connectivity in a handover of a user equipment, UE, in a new radio telecommunications system. The network node is configured to send, from the network node and to a target secondary node, an addition request message to allocate resources for the UE in the handover and receive an addition request acknowledgement message from the target secondary node. The addition request acknowledgement message comprises a context indication regarding a full radio resource control, RRC, context or a delta RRC context. The delta RRC context comprises data that is updated relative to data in a current UE context. Based on the received context indication, the network node is further configured to send, from the network node, a message to the UE including the context indication. Responsive to the context indication comprising a full RRC context, the message sent to the UE includes a flag to release a previous EN-DC configuration and add the full RRC context to the UE. Responsive to the context indication comprising a delta RRC context, the message that includes the flag is not sent to the UE.

Embodiments may be directed to methods of operating a master node to provide dual connectivity in a handover of a user equipment, UE, in a new radio telecommunications system. Methods may include sending, from the master node and to a target secondary node, an addition request message to allocate resources for the UE in the handover, receiving an addition request acknowledgement message from the target secondary node, wherein the addition request acknowledgement message comprises a context indication regarding a full radio resource control, RRC, context or a delta RRC context, and wherein the delta RRC context comprises data that is updated relative to data in a current UE context, and, based on the received context indication, sending, from the network node, a message to the UE including the context indication. Responsive to the context indication comprising a full RRC context, the message sent to the UE includes a flag to release a previous EN-DC configuration and add the full RRC context to the UE. Responsive to the context indication comprising a delta RRC context, the message that includes the flag is not sent to the UE.

Some embodiments are directed to a master node to provide dual connectivity. The master node is configured to send, from the master node and to a target secondary node, an addition request message to allocate resources for the UE in the handover, receive an addition request acknowledgement message from the target secondary node, wherein the addition request acknowledgement message comprises a context indication regarding a full radio resource control, RRC, context or a delta RRC context, and wherein the delta RRC context comprises data that is updated relative to data in a current UE context, and, based on the received context indication, send, from the master node, a message to the UE including the context indication. Responsive to the context indication comprising a full RRC context, the message sent to the UE includes a flag to release a previous EN-DC configuration and add the full RRC context to the UE.

Responsive to the context indication comprising a delta RRC context, the message that includes the flag is not sent to the UE.

Some embodiments are directed to methods of operating a master node to provide dual connectivity. Methods may include sending, from the master node and to a target secondary node, an addition request message to allocate resources for the UE in the handover and receiving an addition request acknowledgement message from the target secondary node, wherein the addition request acknowledgement message comprises a context indication regarding a full radio resource control, RRC, context or a delta RRC context, and wherein the delta RRC context comprises data that is updated relative to data in a current UE context. Methods may include, based on the received context indication, sending, from the master node, a message to the UE including the context indication. Responsive to the context indication comprising a full RRC context, the message sent to the UE includes a flag to release a previous EN-DC configuration and add the full RRC context to the UE. Responsive to the context indication comprising a delta RRC context, the message that includes the flag is not sent to the UE.

Some embodiments are directed to a first network node for operation in cooperation with a second network node to provide dual connectivity, DC, communication with a wireless terminal so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal. The first network node is adapted to send, from the first network node and to a target secondary node, an addition request message to allocate resources for the UE in the handover and receive an addition request acknowledgement message from the target secondary node, wherein the addition request acknowledgement message comprises a context indication regarding a full radio resource control, RRC, context or a delta RRC context, and wherein the delta RRC context comprises data that is updated relative to data in a current UE context. The first network node is further configured to, based on the received context indication, send, from the network node, a message to the UE including the context indication. Responsive to the context indication comprising a full RRC context, the message sent to the UE includes a flag to release a previous EN-DC configuration and add the full RRC context to the UE. Responsive to the context indication comprising a delta RRC context, the message that includes the flag is not sent to the UE.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
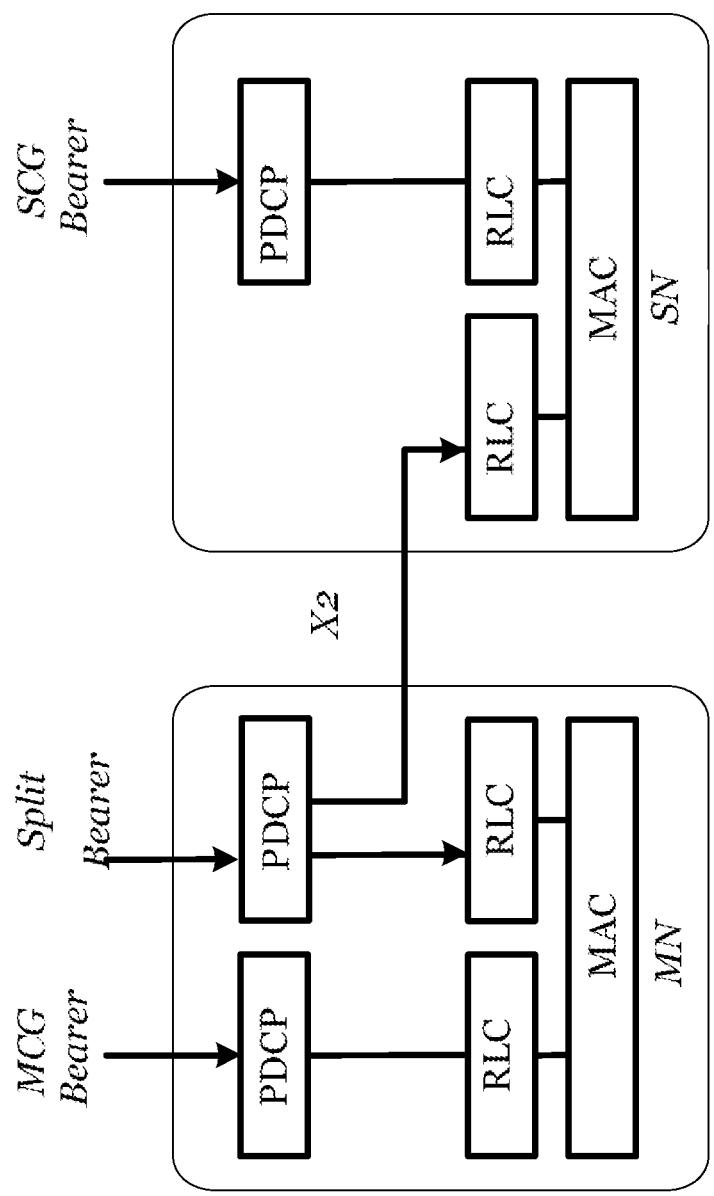
FIG. 1 illustrates a schematic block diagram of a user plane (UP) in LTE dual connectivity (DC) including a master node and a secondary node according to various embodiments of the present disclosure.

Brief reference is now made to FIG. 1, which illustrates a schematic block diagram of a user plane (UP) in LTE dual connectivity (DC) including a master node and a secondary node according to various embodiments of the present disclosure.

In some embodiments, E-UTRAN supports Dual mode Connectivity (DC) operations in which a multiple Rx/Tx UE in RRC_CONNECTED is configured to utilize radio resources provided by two distinct schedulers, located in two eNBs that are connected via a non-ideal backhaul over the X2 interface. The eNBs involved in DC for a certain UE may assume at least two different roles. In a first role, the eNBs may operate as a Master node (MN). In a second role, the eNBs may operate as a secondary node (SN). In DC a UE may be connected to one MN and one SN.

In LTE DC, the radio protocol architecture that a particular bearer uses may depend on how the bearer is setup. For example, three bearer types may exist including a Master Cell Group (MCG) bearer, a Secondary Cell Group (SCG) bearer and a split bearer. A radio resource control (RRC) that may be located in the MN. Signal radio bearers (SRBs) (Signaling Radio Bearers) may always be configured as MCG bearer type and therefore may only use the radio resources of the MN.

Figure 2:
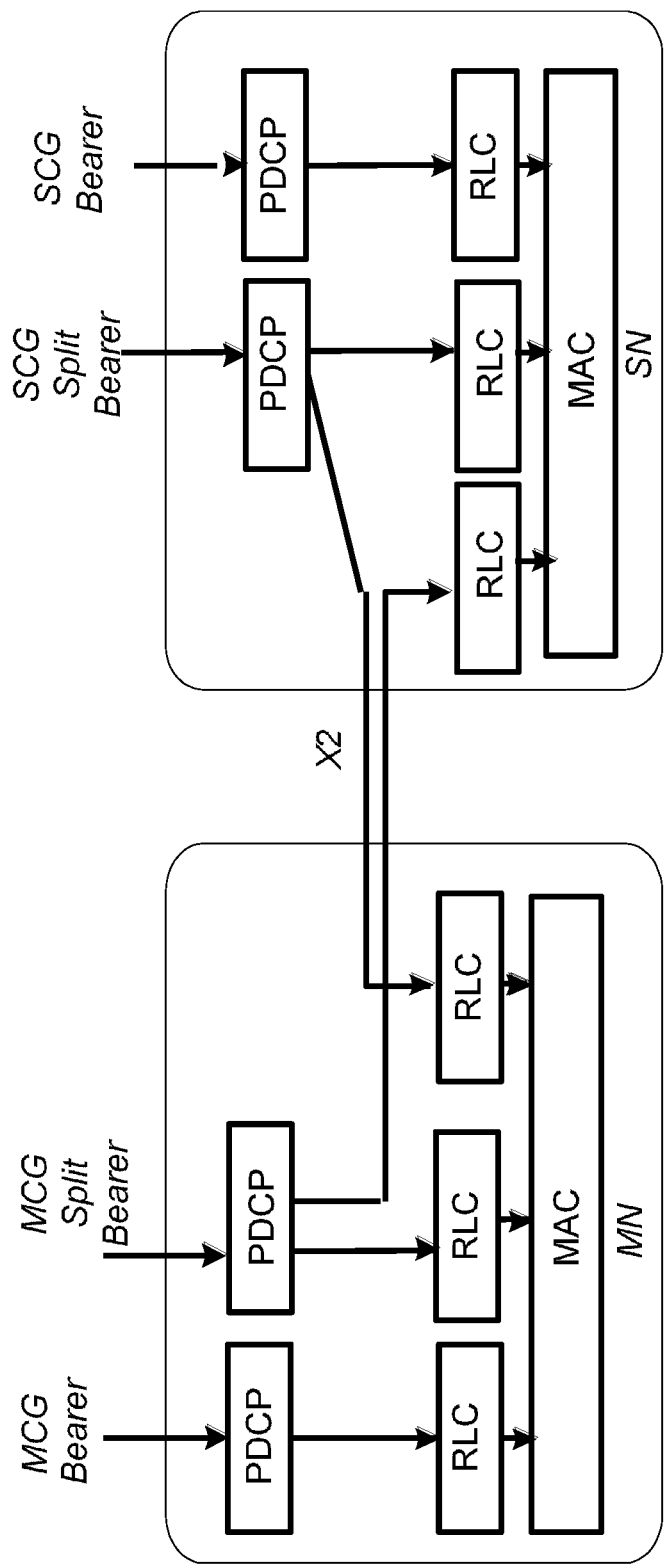
FIG. 2 illustrates a schematic block diagram of a user plane (UP) architecture for LTE NR interworking between a master node and a secondary node according to various embodiments of the present disclosure.
Figure 3:
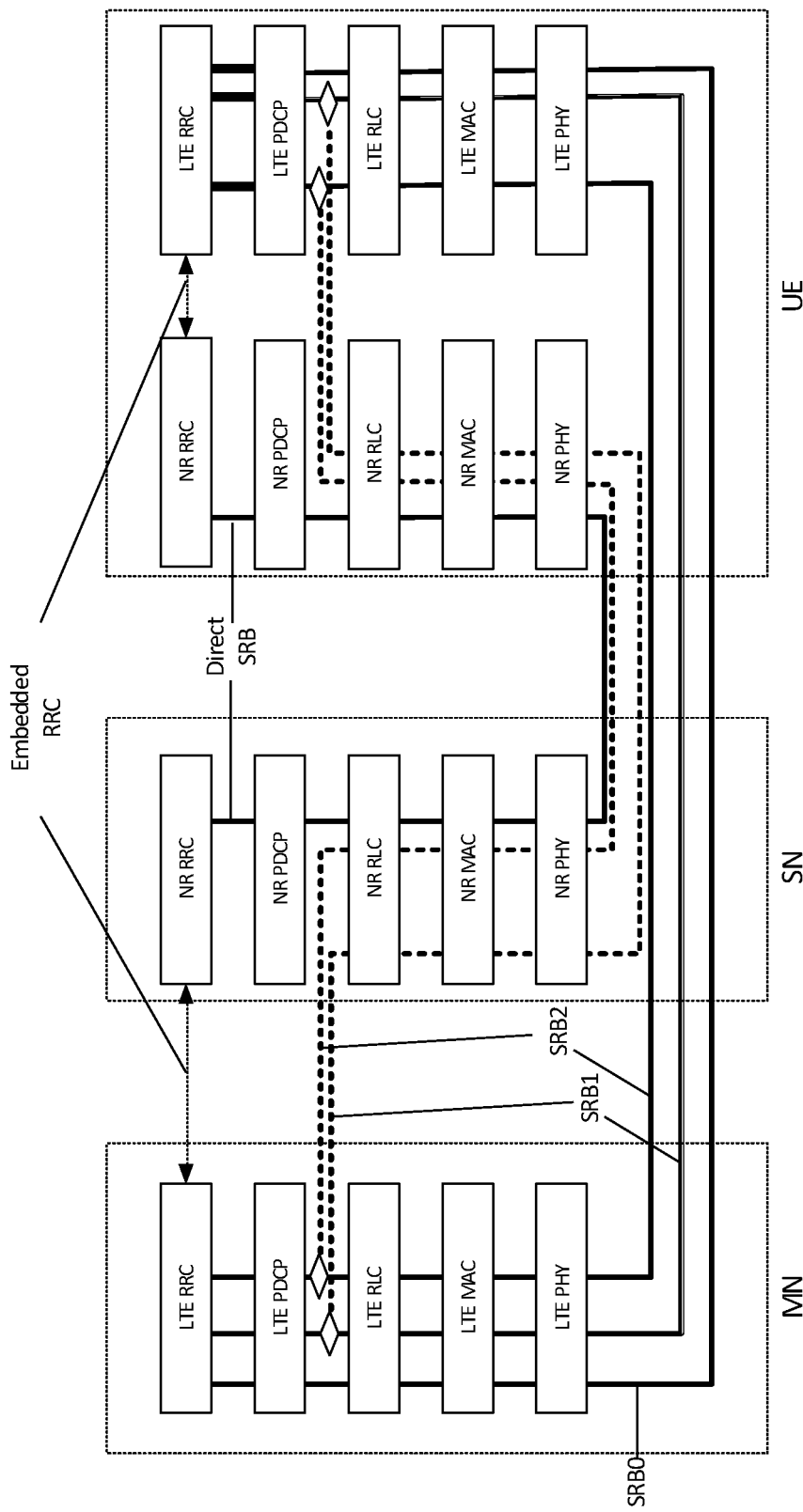
FIG. 3 illustrates a schematic block diagram of a control plane (CP) architecture for LTE NR interworking between a master node and a secondary node according to various embodiments of the present disclosure.

Reference is now made to FIGS. 2 and 3, which illustrate respective schematic block diagrams of a user plane (UP) and control plane (CP) architectures for LTE NR interworking between a master node and a secondary node according to various embodiments of the present disclosure. Some embodiments provide that LTE-NR (New Radio) DC, which may also be referred to as LTE-NR tight interworking, may include the split bearer from the SN, which may be referred to as SCG split bearer. LTE-NR DC may further include the split bearer for RRC and a direct bearer from the SN, which may be referred to as SCG SRB. FIGS. 2 and 3 show the User Plane (UP) and Control Plane (CP) architectures for LTE-NR tight interworking.

In some EN-DC embodiments, the SN may be referred to as SgNB, where gNB is an NR base station, and the MN may be referred to as MeNB in case the LTE is the master node and NR is the secondary node. In some embodiments in which the NR is the master and LTE is the secondary node, the corresponding terms may be SeNB and MgNB.

Some embodiments provide that split RRC messages may be used for creating diversity, and the sender can decide to either choose one of the links for scheduling the RRC messages to duplicate the message over both links. In the downlink, the path switching between the MCG or SCG legs or duplication on both may be left to network implementation. In some embodiments, for the UL, the network may configure the UE to use the MCG, SCG or both legs. The terms "leg" and "path" may be used interchangeably throughout this disclosure.

In the present disclosure, specific terminologies may be used throughout to differentiate different dual connectivity scenarios. For example, in the context of DC, both LTE and NR may both be employed by the master node and the secondary node. EN-DC: LTE-NR may describe dual connectivity in which LTE is the master node and NR is the secondary node. NE-DC: LTE-NR may describe dual connectivity where NR is the master node and LTE is the secondary node. NR-DC, which may also be referred to as NR-NR DC, may describe dual connectivity where both the master node and the secondary node employ NR. Additionally, MR-DC, which may also be referred to as multi-RAT DC, may be a generic term to describe the master node and the secondary node employing different RATs. EN-DC and NE-DC may be two different example cases of MR-DC.

Some embodiments provide that where these bearers are terminated in the network is not important from the UEs perspective anymore. For example, the UE may use a security key that is being configured for each bearer. From a RAN2 point of view it may be fully supported to setup MCG bearers being terminated in the SN using S-KeNB and SCG bearers being terminated in the MN. Similarly, it is possible to support both SN and MN terminated bearers at the same time. For example, both SN terminated split bearers and MN terminated split bearers may be supported.

Some embodiments provide that full RRC configurations may be supported in LTE. In LTE, during a handover (HO) or re-establishment, the UE context may be passed from the source eNB to the target eNB. If the target eNB does not understand any part of the UE configuration, then it may trigger a full configuration. The full configuration procedure is specified in 3GPP TS 36.331 section 5.3.5.8, which is provided below:

---

The UE shall:
1> release/ clear all current dedicated radio configurations except the MCG C-RNTI, the MCG security configuration and the PDCP, RLC, logical channel configurations for the RBs and the logged measurement configuration;
NOTE 1: Radio configuration is not just the resource configuration but includes other configurations like MeasConfig and OtherConfig.
1> if the RRCConnectionReconfiguration message includes the mobilityControlInfo:
    2> release/ clear all current common radio configurations;
    2> use the default values specified in 9.2.5 for timer T310, T311 and constant N310, N311;
1> else:
    2>use values for timers T301, T310, T311 and constants N310, N311, as included in ue-TimersAndConstants received in SystemInformationBlockType2 (or SystemInformationBlockType2-NB in NB-IoT);
    1>apply the default physical channel configuration as specified in 9.2.4;
    1>apply the default semi-persistent scheduling configuration as specified in 9.2.3;
    1>apply the default MAC main configuration as specified in 9.2.2;

1>if the UE is a NB-IoT UE; or
1>for each srb-Identity value included in the srb-ToAddModList (SRB reconfiguration):
    2>apply the specified configuration defined in 9.1.2 for the corresponding SRB;
    2>apply the corresponding default RLC configuration for the SRB specified in 9.2.1.1 for SRB1 or in 9.2.1.2 for SRB2;
    2>apply the corresponding default logical channel configuration for the SRB as specified in 9.2.1.1 for SRB1 or in 9.2.1.2 for SRB2;
NOTE 2: This is to get the SRBs (SRB1 and SRB2 for handover and SRB2 for reconfiguration after reestablishment) to a known state from which the reconfiguration message can do further configuration.
1> for each eps-BearerIdentity value included in the drb-ToAddModList that is part of the current UE configuration:
    2>release the PDCP entity;
    2>release the RLC entity or entities;
    2>release the DTCH logical channel;
    2>release the drb-identity,
NOTE 3: This will retain the eps-bearerIdentity but remove the DRBs including drb-identity of these bearers from the current UE configuration and trigger the setup of the DRBs within the AS in Section 5.3.10.3 using the new configuration. The eps-bearerIdentity acts as the anchor for associating the released and re-setup DRB. In the AS the DRB re-setup is equivalent with a new DRB setup (including new PDCP and logical channel configurations).
    1> for each eps-BearerIdentity value that is part of the current UE configuration but not part of the drb-ToAddModList:
        2> perform DRB release as specified in 5.3.10.2;

As provided above, the full configuration option may include an initialization of the radio configuration, which may make the procedure independent of the configuration used in the source cell(s) with the exception that the security algorithms are continued for the RRC re-establishment. If a DRB is not included in the drb-ToAddModList, the DRB may be released, and hence a message to upper layers may be sent indicating the release of the bearer. For example, a full-fledged bearer setup from scratch may be performed to continue data service(s) associated with the released bearer(s). For those bearers included in the drb-toAddModList, the PDCP/RLC/LCH entities may be released and established again.

In some embodiments, advantages with using full configuration may be that the target node of the handover may not need to understand the UE configuration in the source node. In such embodiments, mobility between different nodes which support different protocol versions of the RRC and other protocols may be supported. Further, circumstances in which the source and target nodes support different solutions for UE handling and configuration may be supported. Examples of such cases include solutions that may use a different algorithm.

Some embodiments provide that a disadvantage of using full configuration versus delta signaling is that full configuration may lead to larger messages that are sent over the radio relative to delta signaling where only relevant parts of the UE context are reconfigured.

In the case of LTE DC, since the RRC is still maintained at the MN only, the full configuration may apply to both MCG and SCG parts of the configuration. In the case of EN-DC, the situation may be different for full configuration considerations from LTE DC because there may be an LTE and a NR part in the UE configuration. Relevant portions of the RRCConnectionReconfiguration message for EN-DC are reproduced below:

```
RRCConnectionReconfiguration-r8-IEs ::= SEQUENCE {
    measConfig                MeasConfig                  OPTIONAL, -- Need ON
    mobilityControlInfo       MobilityControlInfo         OPTIONAL, -- Cond HO
    dedicatedInfoNASList      SEQUENCE (SIZE(1..maxDRB)) OF
                              DedicatedInfoNAS            OPTIONAL, -- Cond nonHO
    radioResourceConfigDedicated  RadioResourceConfigDedicated OPTIONAL, -- Cond HO-toEUTRA
    securityConfigHO          SecurityConfigHO            OPTIONAL, -- Cond HO
    nonCriticalExtension      RRCConnectionReconfiguration-v890-1Es   OPTIONAL
}
RRCConnectionReconfiguration-v15x0-IEs ::= SEQUENCE {
    en-DC-release             BOOLEAN                     OPTIONAL,
        sk-Counter            INTEGER (0.. 65535)         OPTIONAL, -- Need ON
    nr-secondaryCellGroupConfig-r15  OCTET STRING         OPTIONAL,
    radioBearerConfig-r15     OCTET STRING                OPTIONAL,
    radioBearerConfigS-r15    OCTET STRING                OPTIONAL,
    nonCriticalExtension      SEQUENCE { }                OPTIONAL
}
```

During HO, the source eNB may include the HandoverPreparationInformation message to the target in the HO request message. Relevant portions of the HandoverPreparationInformation message for EN-DC are provided below:

```
HandoverPreparationInformation-r15-IEs ::= SEQUENCE {
    ue-CapabilityRAT-List   UE-CapabilityRAT-ContainerList,
    sourceConfig-r15        OCTET STRING (CONTAINING RRCReconfiguration)
    rrm-Config              RRM-Config           OPTIONAL,
    as-Context              AS-Context           OPTIONAL,
    nonCriticalExtension    SEQUENCE { }         OPTIONAL
}
```

As can be seen, the sourceConfig-r15 IE in the HandoverPreparationInformation message may contain the RRCReconfiguration. In the RRCConnectionReconfiguration message, the parts highlighted in bold text may be relevant for the target eNB (i.e., MCG configuration). Portions shown in italics may be relevant for the target SN (i.e., SCG configuration). The parts relevant to the SN may be the ones that will be included in the SCG-ConfigInfo that may be optionally sent to the target SN during SgNB addition.

Embodiments herein provide that four different scenarios may be considered depending on whether the target eNB and SgNB can understand the configurations that are relevant to them. The first scenario is one in which the target eNB understands the MCG part and the target SN understands the SCG part. In this scenario, since both target eNB and target SN understand the configuration relevant to them, a delta configuration can be applied to both the MCG and SCG configurations.

A second scenario provides that the target eNB does not understand the MCG part and the target SN does not understand the SCG part. In this scenario, since both target eNB and target SN do not understand the configuration relevant to them, a full configuration may be applied to both the MCG and SCG configurations.

A third scenario provides that the target eNB does understand the MCG part and the target SN does not understand the SCG part and the fourth scenario provides that the target eNB does not understand the MCG part and the target SN does understand the SCG part. Embodiments herein may provide approaches corresponding to the third and fourth scenarios to determine which of a full reconfiguration or a delta reconfiguration may be applied to the MCG and SCG configuration.

Certain aspects of the present disclosure and their embodiments may provide solutions to these or other challenges. Certain embodiments may address the issue of full and delta RRC configurations in EN-DC. According to some embodiments, if the target eNB does not understand the MCG part of the UE configuration that is passed to it from the source eNB, a full configuration may be applied to both the MCG and SCG configurations. In such embodiments, the target eNB may communicate to the target SN, upon SgNB addition request, that a full SCG configuration may be applied.

If the target eNB does understand the MCG part of the UE configuration, but the SgNB does not understand the SCG configuration, full SCG configuration may be applied while a delta configuration can be used for the MCG. In such embodiments, the target SgNB, upon receiving the SgNB addition request acknowledgement, may provide an indication to the MN that the SCG configuration that it is providing is a full configuration. One advantage of using delta configuration may be a smaller message size relative to the full configuration, which may reduce network and radio load and interference and/or battery consumption in the device.

As described herein, various embodiments that address one or more of the issues disclosed herein may provide one or more of the following technical advantages. Methods according to some embodiments herein may provide that a full MCG configuration may not be used when the target eNB is able to understand the UE's MCG configuration even if the SgNB is not able to understand the UE's SCG configuration.

Additionally, according to some embodiments, when the target eNB does not understand the MCG configuration, some embodiments provide that the legacy full reconfiguration may be reused to fully reconfigure both of the MCG and SCG configurations, without the need for major change in standardization. Particular embodiments may provide all, some, or none of these advantages, and other advantages may be readily apparent from the disclosure set forth below.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments herein may correspond to EN-DC in which the MN is an eNB that is running LTE RRC and the SN is a gNB that is running NR. However, the embodiments herein may be equally applicable to any MR-DC network in which the MN and SN are using RRC specifications from different RATs. Furthermore, the various embodiments herein may be combined and/or modified as appropriate.

During a HO in EN-DC, if the target eNB understands the MCG part of the UE's configuration that is passed from the source eNB, it may not be necessary to do a full configuration of the MCG. Instead, it may be sufficient to do a full reconfiguration of only the SCG. In such embodiments, the SgNB may inform the MN (e.g., in the SgNB Addition Request ACK message) that a full SCG configuration is to be applied.

In some embodiments, in EN-DC, during a HO procedure, if the target SgNB does not understand the SCG configuration, the target SgNB may include an indication that a full SCG configuration is to be applied as well as the full SCG configuration in the SgNB Addition Request ACK message. For example, an example portion of a RRCConnectionReconfiguration procedure for EN-DC provides that:

1> if the received RRCConnectionReconfiguration includes en-DC-release:
2> perform secondary cell group release as specified in TS38.331 subclause 5.3.5.4a and release nr-secondaryCellGroupConfig;
1> if the received RRCConnectionReconfiguration includes the sk-counter:
2> perform key update procedure as specified in in TS 38.331 subclause 5.3.5.7;

1> if the received RRCConnectionReconfiguration includes the nr-secondaryCellGroupConfig:
2> perform NR RRC Reconfiguration as specified in in TS 38.331 subclause 5.3.5.3.
1> if the received RRCConnectionReconfiguration includes the radioBearerConfig:
2> perform radio bearer configuration as specified in in TS 38.331 subclause 5.3.5.5;
1> if the received RRCConnectionReconfiguration includes the radioBearerConfigS:
2> perform radio bearer configuration as specified in in TS 38.331 subclause 5.3.5.5.

As can be seen above, the SCG can be released and added in the same message by setting the en-DC-release flag, which may be equivalent to the full configuration of the SCG. Thus, if the SgNB has indicated in the SgNB Addition Request ACK message that a full SCG configuration is to be applied, all the target eNB has to do is to set the en-DC-release flag to TRUE.

According to some embodiments, in EN-DC, full SCG reconfiguration may be achieved by setting the en-DC-release bit in the RRCConnectionReconfiguration message to TRUE to release the SCG, without the need to revert to a full configuration of the MCG. In the scenarios described above in which the target eNB does not understand the corresponding configuration, a full MCG configuration may be made. If the LTE full reconfiguration discussion is to be reused here, all bearers (MCG and/or SCG) may be terminated, and thus released. Some embodiments provide that they can be added in the same reconfiguration message by including them in the drb-ToAddMod list. Considerable changes in the RRC Connection Reconfiguration procedure may be performed if we want to preserve the SCG configuration and perform a delta configuration on the SCG. Thus, the embodiments including performing a full configuration to be applied for both MCG and SCG if the target eNB is not able to understand the MCG part of the configuration may be used.

Some embodiments provide that in EN-DC during a HO procedure, if the target eNB does not understand the MCG configuration, a full configuration of both the MCG and SCG may be applied. To ensure that the SgNB also applies a full configuration, the target eNB may inform the SgNB that it has to do so.

Some embodiments provide that in EN-DC during HO procedure, if the target eNB does not understand the MCG configuration, the target eNB may include an indication that a full SCG configuration is to be applied in the SgNB in an addition Request message.

Yet further embodiments may provide that the target eNB does not include the SCG-configInfo in the SgNB addition request message. In such embodiments, the SgNB may be forced to do a full reconfiguration of the SCG.

The various embodiments have been discussed above in terms of UEs, wireless devices, and various network nodes operating in a wireless network. The network aspects of these embodiments can also be deployed in a cloud environment. These network elements and configurations will now be described in more detail below.

Figure 4:
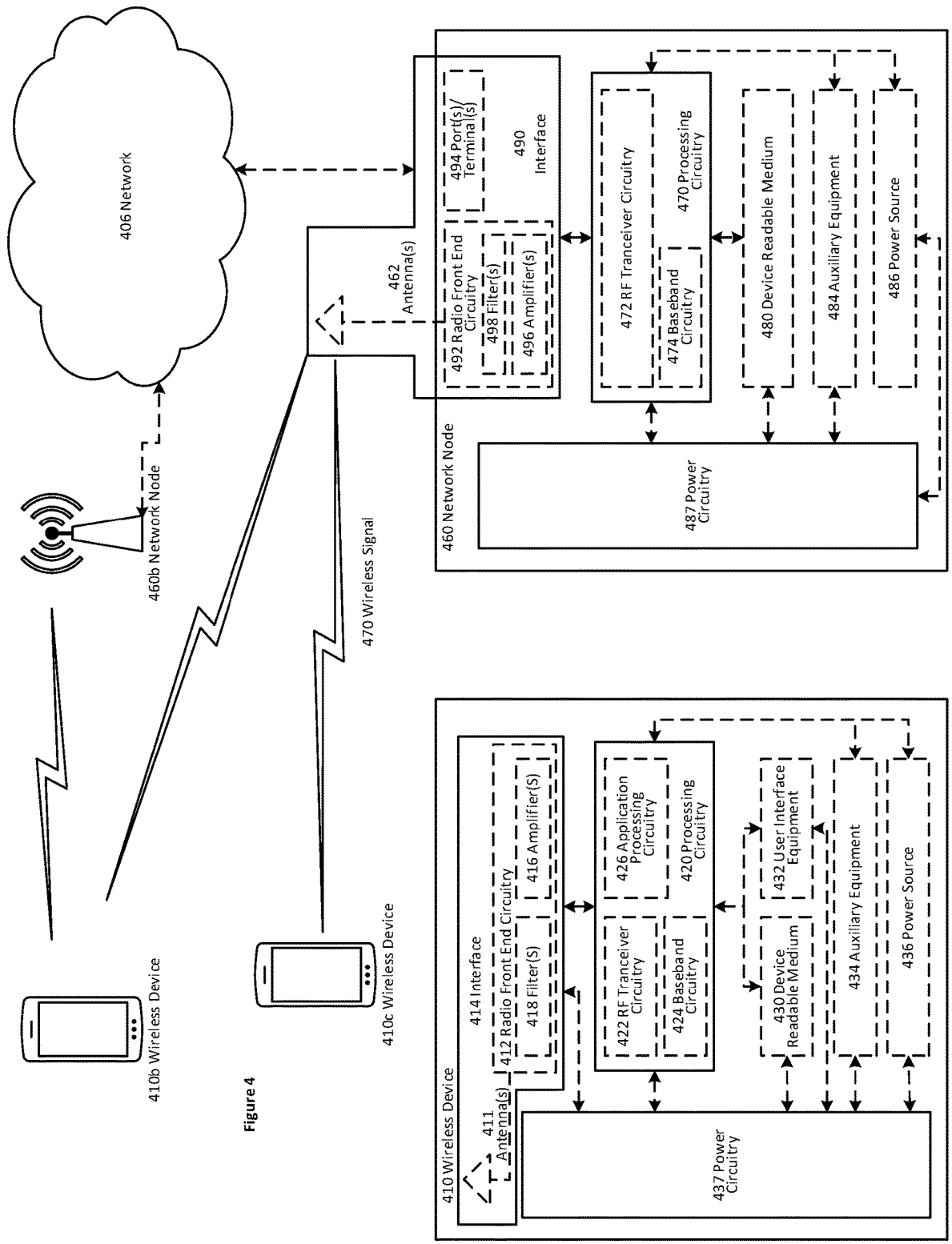
FIG. 4 illustrates a schematic block diagram of a wireless network in accordance with various embodiments of the present disclosure.

Reference is now made to FIG. 4, which illustrates a schematic block diagram of a wireless network in accordance with various embodiments of the present disclosure.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
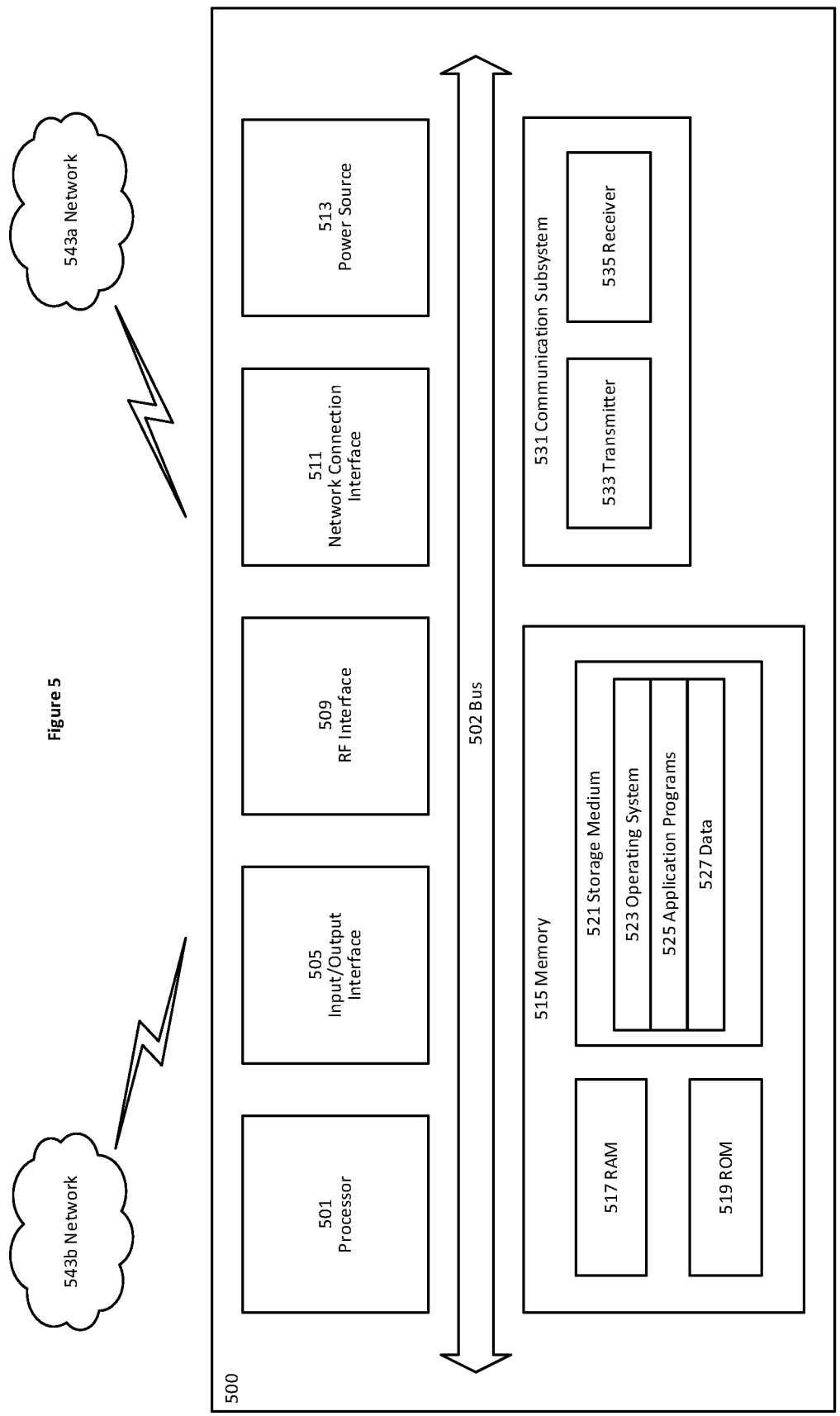
FIG. 5 illustrates a schematic block diagram of user equipment in accordance with various embodiments of the present disclosure.

Reference is now made to FIG. 5, which illustrates a schematic block diagram of user equipment in accordance with various embodiments of the present disclosure.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3$^{rd}$ Generation Partnership Project (3GPP), including a NB-IoT UE that is not intended for sale to, or operation by, a human user. UE 500, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543*a*. Network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
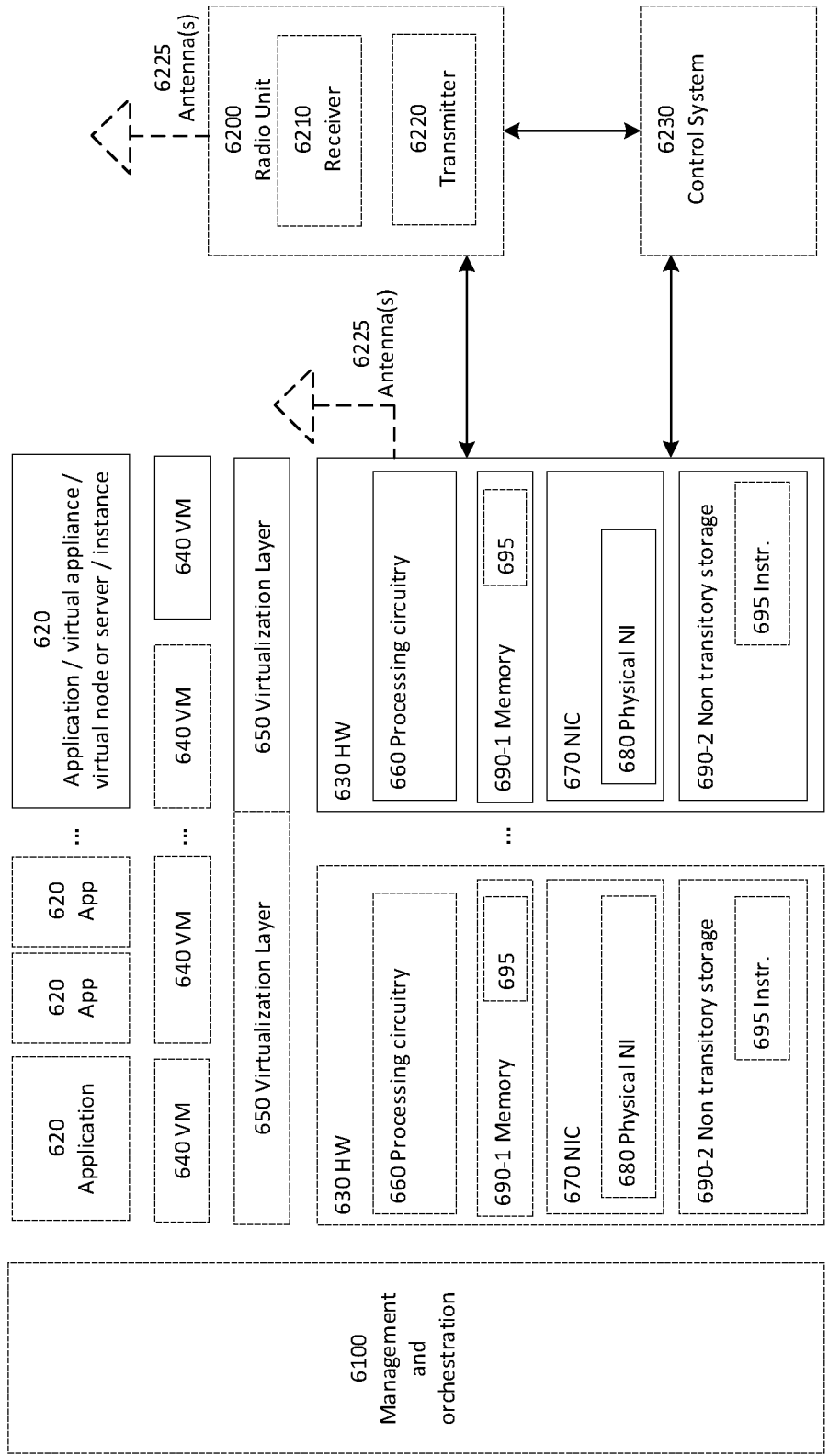
FIG. 6 is a schematic block diagram illustrating a virtualization environment in which functions implemented by various embodiments of the present disclosure may be virtualized.

Reference is now made to FIG. 6, which is a schematic block diagram illustrating a virtualization environment in which functions implemented by various embodiments of the present disclosure may be virtualized.

In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
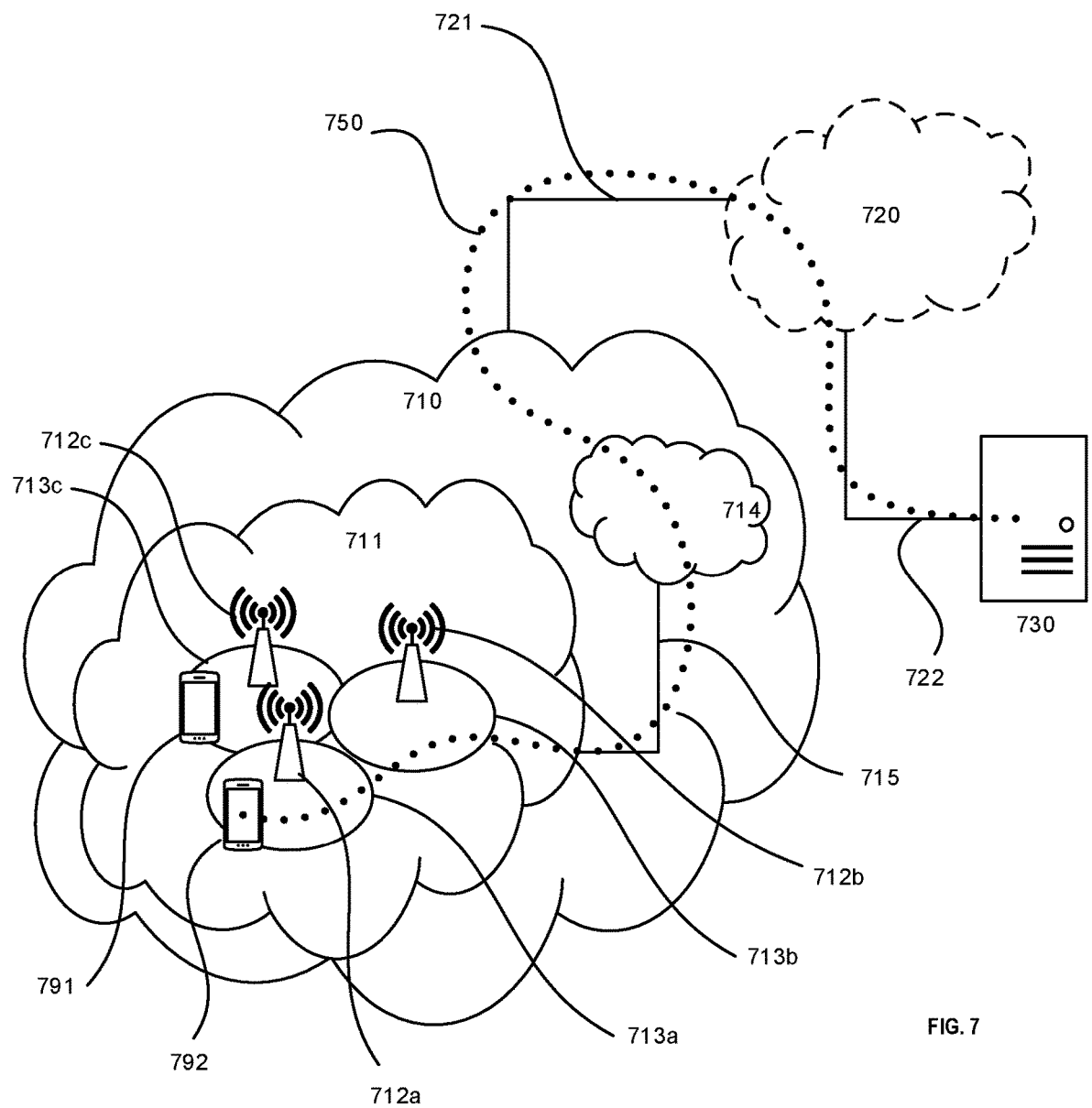
FIG. 7 is a schematic block diagram illustrating a telecommunication network connected via an intermediate network to a host computer in accordance with various embodiments of the present disclosure.

Reference is now made to FIG. 7, which is a schematic block diagram illustrating a telecommunication network connected via an intermediate network to a host computer in accordance with various embodiments of the present disclosure. In accordance with some embodiments, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
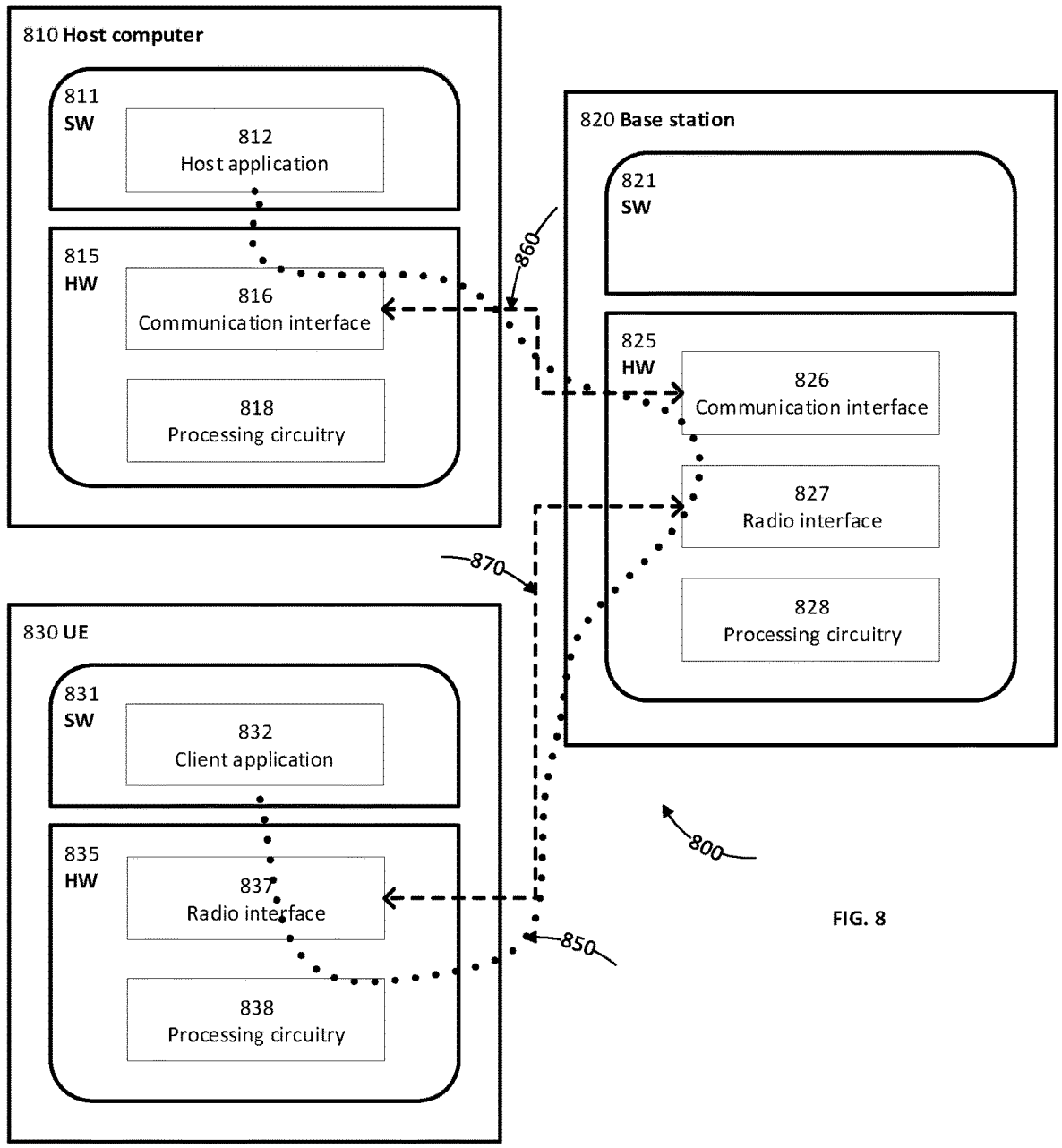
FIG. 8 is a schematic block diagram illustrating a host computer communicating via a base station with a user equipment over a partially wireless connection in accordance with various embodiments of the present disclosure.

Reference is now made to FIG. 8, which is a schematic block diagram illustrating a host computer communicating via a base station with a user equipment over a partially wireless connection in accordance with various embodiments of the present disclosure.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the data rate, latency, and power consumption, and thereby provide benefits such as reduced network and radio load and interference as well as battery consumption in the device.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
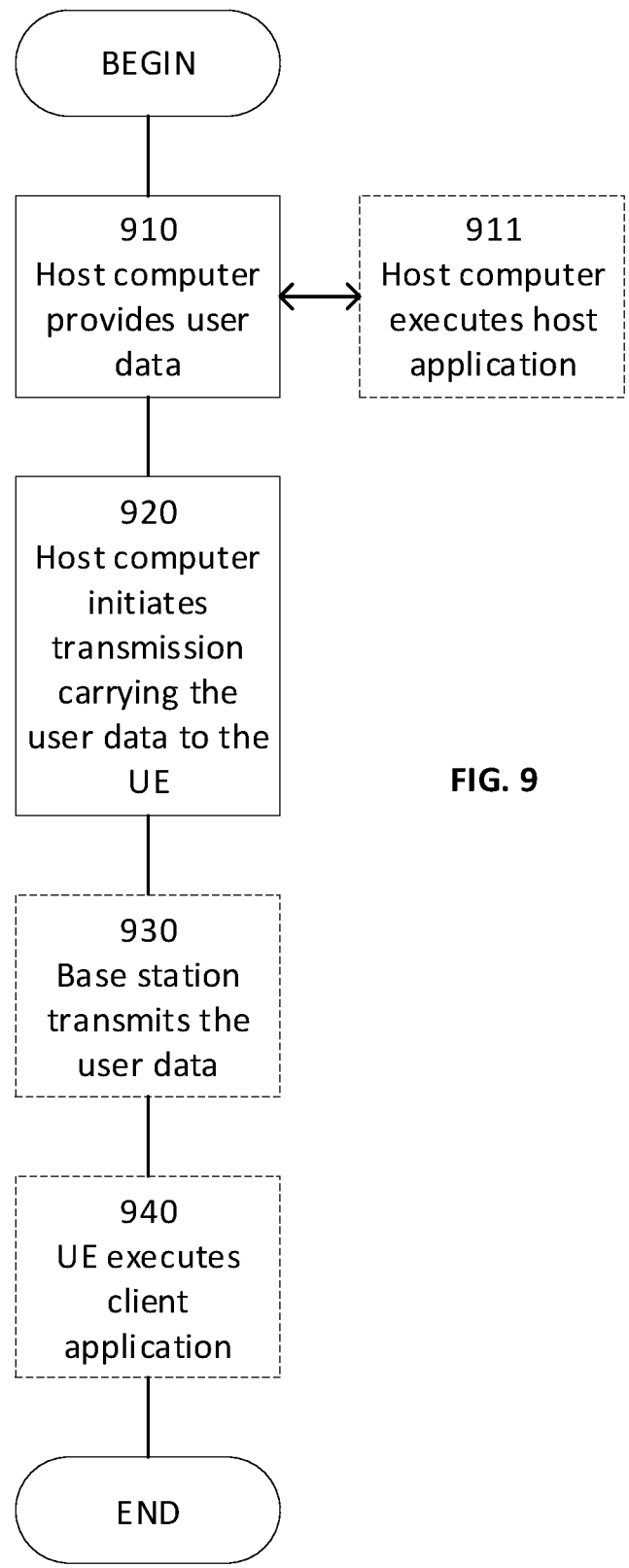
FIG. 9 is a flowchart illustrating methods implemented in a communication system in accordance with various embodiments of the present disclosure.

Reference is now made to FIG. 9, which is a flowchart illustrating methods implemented in a communication system in accordance with various embodiments of the present disclosure.

The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
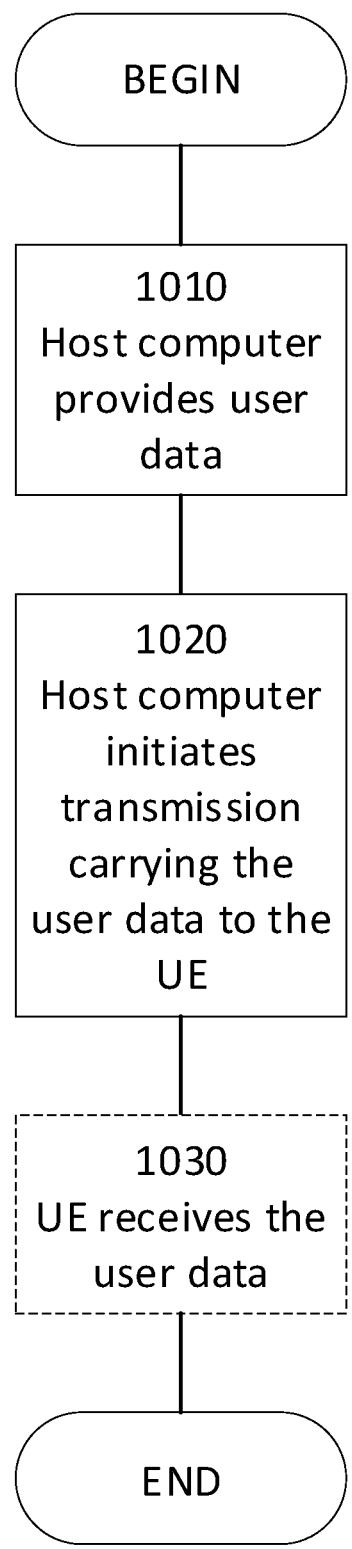
FIG. 10 is a flowchart illustrating methods implemented in a communication system in accordance with various embodiments of the present disclosure.

Reference is now made to FIG. 10, which is a flowchart illustrating methods implemented in a communication system in accordance with various embodiments of the present disclosure. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
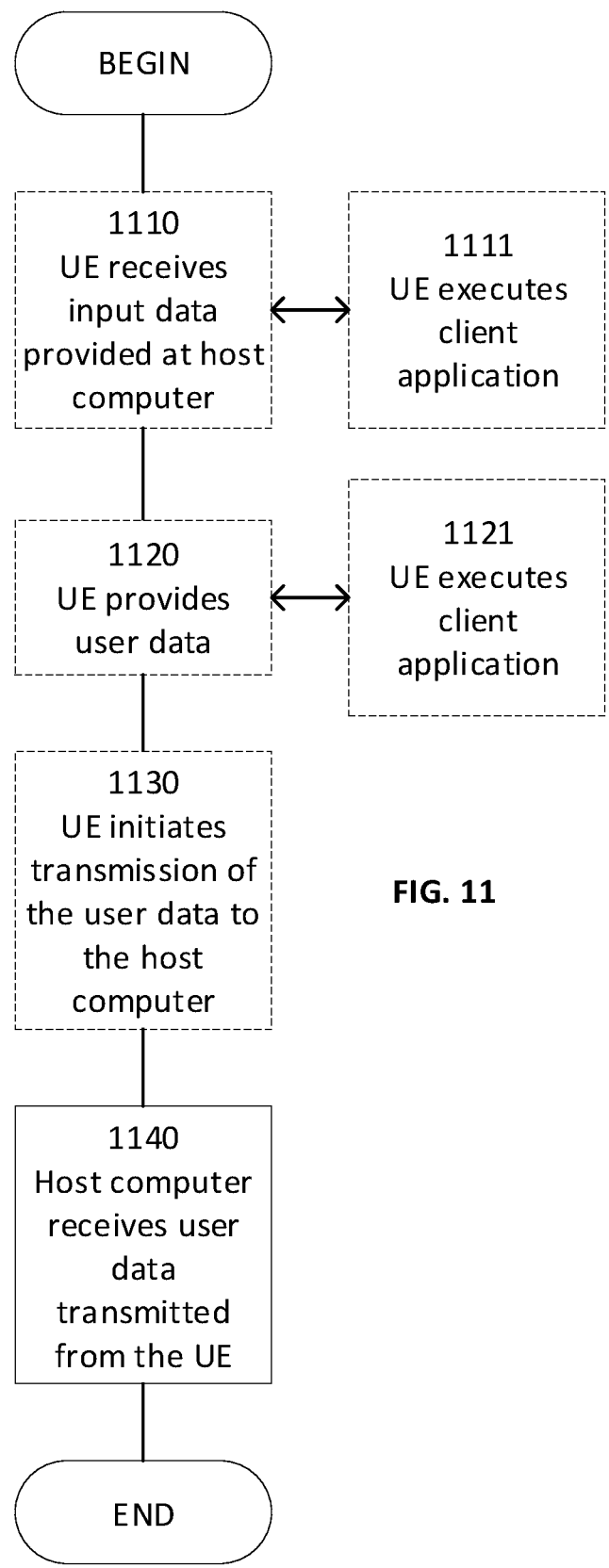
FIG. 11 is a flowchart illustrating methods implemented in a communication system in accordance with various embodiments of the present disclosure.

Reference is now made to FIG. 11, which is a flowchart illustrating methods implemented in a communication system in accordance with various embodiments of the present disclosure.

The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
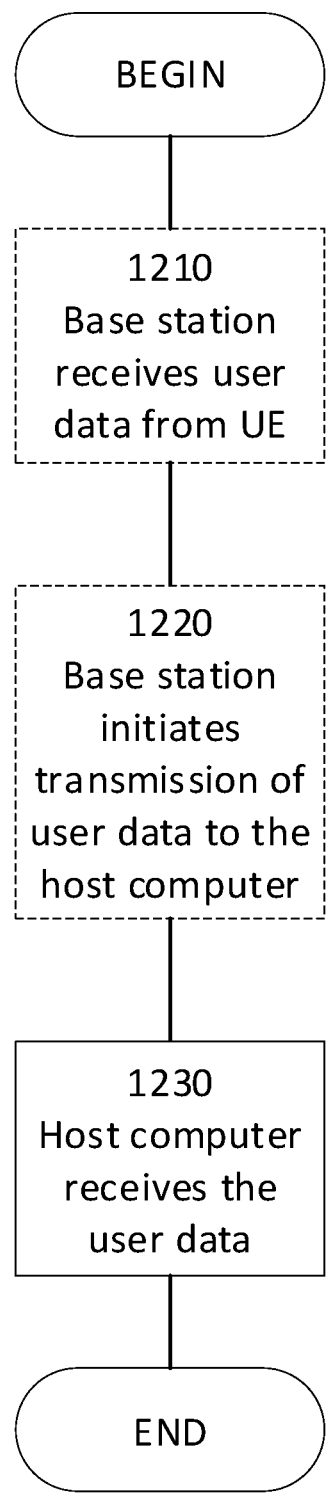
FIG. 12 is a flowchart illustrating methods implemented in a communication system in accordance with various embodiments of the present disclosure.

Reference is now made to FIG. 12, which is a flowchart illustrating methods implemented in a communication system in accordance with various embodiments of the present disclosure.

The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
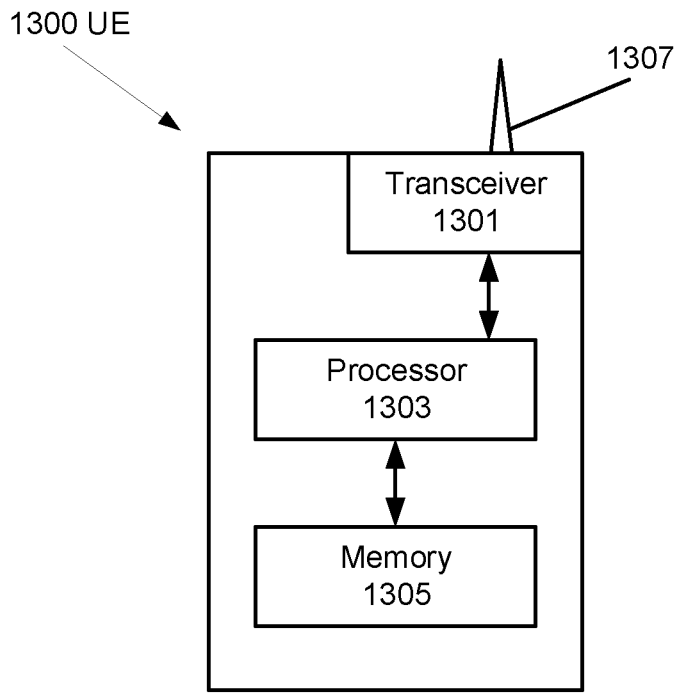
FIG. 13 illustrates a block diagram of a user equipment which may be used in a communications system described herein and configured to operate according to various embodiments of the present disclosure.

Reference is now made to FIG. 13, which illustrates a block diagram of a user equipment 1300 which may be used in a communications system described herein and configured to operate according to various embodiments of the present disclosure. The UE 1300 (also referred to as a wireless terminal, a wireless communication device, a wireless communication terminal, user equipment, a user equipment node/terminal/device, etc.) may be configured to operate according to embodiments disclosed herein. As shown, the UE 1300 may include an antenna 1307, and a transceiver circuit 1301 (also referred to as a transceiver) including a transmitter and a receiver configured to provide uplink and downlink radio communications with a base station of a radio access network. The UE 1300 may also include at least one processor circuit 1303 (also referred to as a processor) coupled to at least one transceiver circuit 1301 (also referred to as a transceiver), and at least one memory circuit 1305 (also referred to as memory) coupled to the processor circuit. The memory 1305 may include computer readable program code that when executed by the processor 1303 causes the processor 1303 to perform operations according to embodiments disclosed herein for a UE. According to other embodiments, processor 1303 may be defined to include memory so that a separate memory circuit is not required. The UE 1300 may also include an interface (such as a user interface) coupled with processor 1303.

As discussed herein, operations of the UE 1300 may be performed by processor 1303 and/or transceiver 1301. Moreover, modules may be stored in memory 1305, and these modules may provide instructions so that when instructions of a module are executed by processor 1303, processor 1303 performs respective operations according to one or more embodiments herein.

Figure 14:
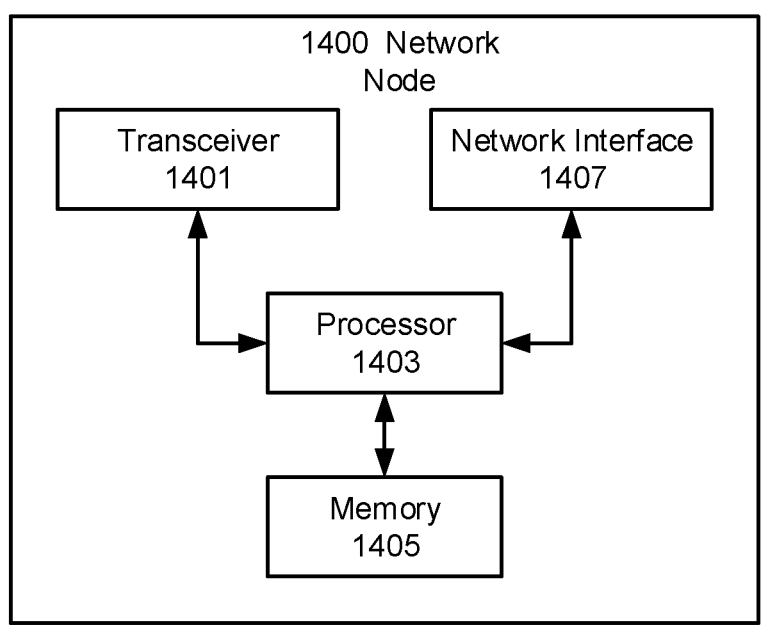
FIG. 14 illustrates modules residing in a network node that perform operations as disclosed herein according to various embodiments.

Reference is now made to FIG. 14, which illustrates modules residing in a network node that perform operations as disclosed herein according to various embodiments. The network node 1400 includes elements that may correspond to any one or more of the MN, SN, UPF, and AMF configured to operate according to one or more embodiments disclosed herein. As shown, the network node 1400 may include at least one transceiver circuit 1401 (also referred to as a transceiver) including a transmitter and a receiver configured to provide uplink and downlink radio communications with UEs. The network node 1400 may include at least one network interface circuit 1407 (also referred to as a network interface) configured to provide communications with other network nodes. The network node 1400 may also include at least one processor circuit 1403 (also referred to as a processor) coupled to the transceiver 1401, and at least one memory circuit 1405 (also referred to as memory) coupled to the processor 1403. The memory 1405 may include computer readable program code that when executed by the processor 1403 causes the processor 1403 to perform operations according to embodiments disclosed herein for a network node. According to other embodiments, processor 1403 may be defined to include memory so that a separate memory circuit is not required.

As discussed herein, operations of the network node 1400 may be performed by processor 1403, network interface 1407, and/or transceiver 1401. For example, processor 1403 may control transceiver 1401 to transmit communications through transceiver 1401 over a radio interface to one or more UEs and/or to receive communications through transceiver 1401 from one or more UEs over a radio interface. Similarly, processor 1403 may control network interface 1407 to send communications through network interface 1407 to one or more other network nodes and/or to receive communications through network interface 1407 from one or more other network nodes. Moreover, modules may be stored in memory 1405, and these modules may provide instructions so that when instructions of a module are executed by processor 1403, processor 1403 performs respective operations (e.g., operations discussed below with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

Figure 15:
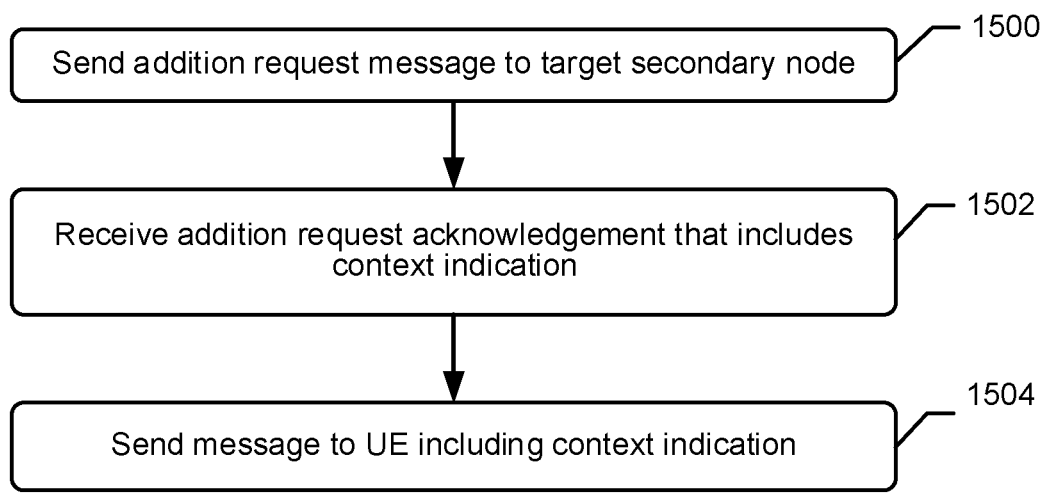
FIG. 15 is a flowchart illustrating methods implemented in a communication system in accordance with various embodiments of the present disclosure.

Reference is now made to FIG. 15, which is a flowchart illustrating methods implemented in a communication system to provide dual connectivity in a handover of a user equipment in a new radio telecommunications system in accordance with various embodiments. Operations include sending, from the network node and to a target secondary node, an addition request message to allocate resources for the UE in the handover (block 1500). In some embodiments, the network node is a long-term evolution node and a target secondary node is a new radio secondary node.

Operations may include receiving an addition request acknowledgement message that includes a context indication from the target secondary node (block 1502). Some embodiments provide that the context indication indicates a full radio resource control, RRC, context or a delta RRC context. In some embodiments, the delta RRC context includes data that is updated relative to data in a current UE context. Some embodiments provide that the full RRC and the delta RRC data for a master cell group, MCG, that corresponds to the network node and a secondary cell group, SCG; that corresponds to a source secondary node.

Some embodiments provide that the context indication includes a flag value that may be included in the addition request acknowledgement message. For example, the flag value may indicate that either one or both of the target main node and the target secondary node may have the UE context updated as a full RRC context.

In some embodiments, the type of RRC context may be determined based on the context indication (block 1504). In some embodiments, the addition request message includes an addition trigger indication. In such embodiments, the addition request acknowledgement message may include a RRC configuration indication that informs the network node that is the target secondary node whether to apply the full configuration or the delta configuration.

In some embodiments, based on the received context indication, operations include sending (1504), from the network node, a message to the UE including the context indication. Responsive to the context indication including a full RRC context, the message sent to the UE includes a flag to release a previous EN-DC configuration and add the full RRC context to the UE. Responsive to the context indication comprising a delta RRC context, the message that includes the flag is not sent to the UE.

In some embodiments, the UE context includes a master cell group, MCG, configuration portion and a secondary cell group, SCG, configuration portion. If the master target node is able to process the MCG portion configuration and the secondary target node is able to process the SCG configuration portion, then the network node releases the full RRC corresponding to the MCG configuration portion to the target master node and the full RRC corresponding to the SCG configuration portion to the secondary target node.

In some embodiments, if the master target node is able to process the MCG portion configuration and the secondary target node is not able to process the SCG configuration portion, then the network node releases the delta RRC corresponding to the MCG configuration portion to the target master node and the full RRC corresponding to the SCG configuration portion to the secondary target node.

Some embodiments provide that if the master target node is not able to process the MCG portion configuration, then the network node releases the full RRC corresponding to the MCG configuration portion to the target master node and the full RRC corresponding to the SCG configuration portion to the secondary target node.

Figure 16:
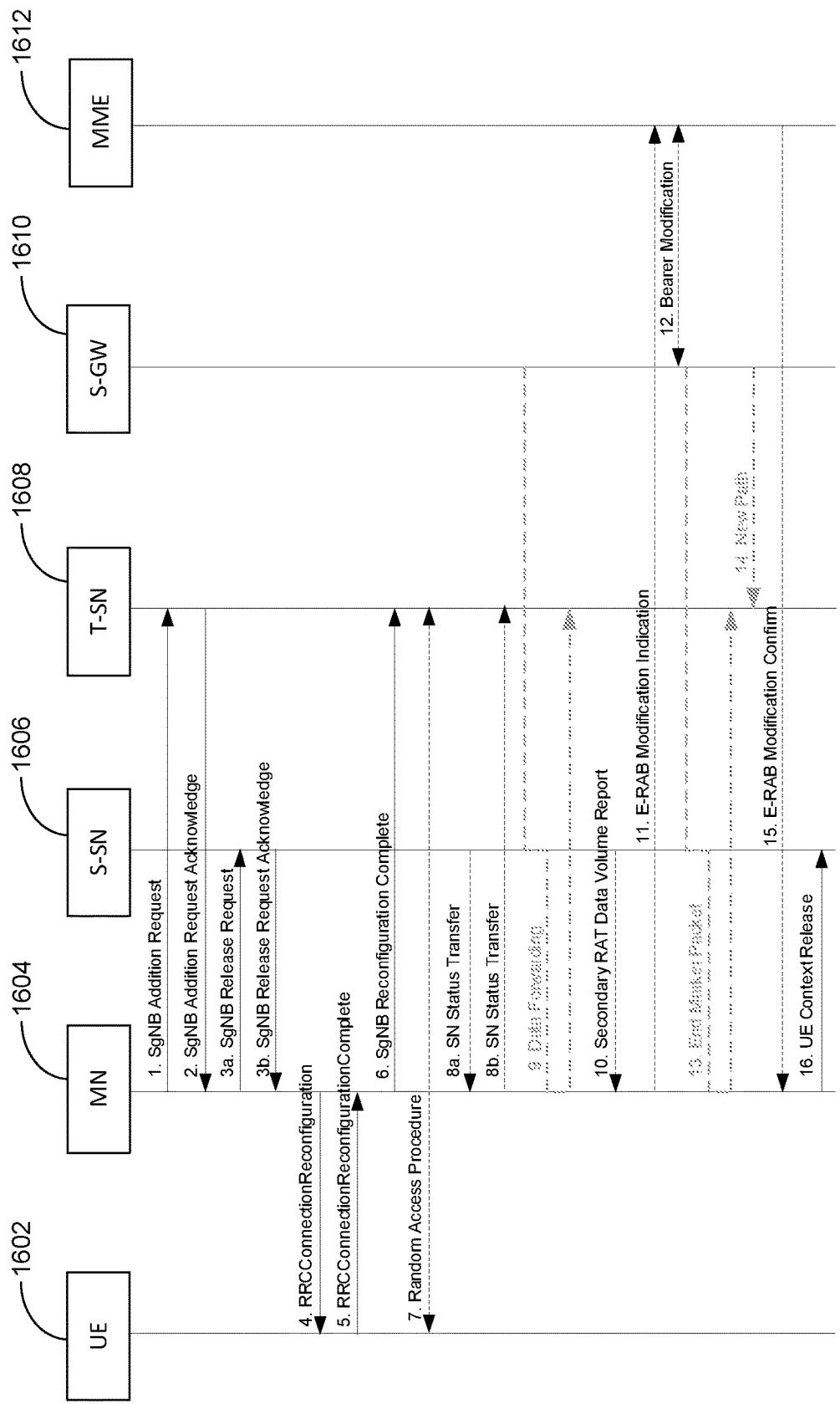
FIG. 16 is a data flow diagram according to various embodiments of the present disclosure.

Reference is now made to FIG. 16, which is a data flow diagram according to various embodiments of the present disclosure. As illustrated, the MN 1604 initiates the SN change from the source S-SN 1606 by requesting the target T-SN 1608 to allocate resources for the UE 1602 using the SgNB addition procedure. The MN 1604 may include measurement results related to the T-SN 1608. If forwarding is needed, then the T-SN 1608 may provide forwarding addresses to the Mn 1604. In some embodiments, the T-SN 1608 may include an indication regarding whether a full or delta RRC context is needed. In some embodiments, the MN 1604 may send the SgNB modification request message to the S-SN 1606 to request the current configuration.

If the allocation of T-SN 1608 was successful, the MN 1604 may initiate the release of the S-SN 1608 resources. The S-SN 1608 may reject the release. If data forwarding is needed the MN 1604 may provide data forwarding addresses to the SN 1606. Reception of the SgNB release request message triggers the S-SN 1604 to stop providing user data to the UE 1602.

The MN 1604 triggers the UE 1602 to apply the new configuration. The UE 1602 applies the new configuration and sends the RRC connection reconfiguration complete message. Remaining operations described in FIG. 16 are not directly applicable to the methods described herein and thus discussion thereof will be omitted.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MeNB Master eNB
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SeNB Secondary eNB
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TNL Transport Network Layer
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method of operating a network node to provide dual connectivity in a New Radio (NR) telecommunications system, the method comprising:

sending, to a target secondary node (T-SN), an addition request message to allocate resources for a user equipment (UE) in a handover;

receiving an addition request acknowledgement message from the T-SN, wherein the addition request acknowledgement message comprises an indication that the T-SN applied a full radio resource control (RRC) context or a delta RRC context, wherein the delta RRC context comprises data that is updated relative to data in a UE context;

sending, to the UE, an RRC connection reconfiguration message that includes a flag indicating to release a previous EN-DC configuration and to apply the full RRC context;

receiving, from the UE, an RRC connection reconfiguration complete message; and responsive to a target master node being able to process a MCG configuration portion of the UE context and the T-SN not being able to process an SCG configuration portion of the UE context, releasing the delta RRC context corresponding to the MCG configuration portion to the target master node and the full RRC context corresponding to the SCG configuration portion to the T-SN.

2. The method of claim 1, wherein the addition request message comprises a Secondary gNB (SgNB) addition request message, and wherein the addition request acknowledgement message comprises a Secondary gNB (SgNB) addition request acknowledgement message.

3. A computer program product comprising a non-transitory computer readable medium storing program code that when executed by a processor of a network node causes the network node to perform operations comprising:

sending, to a target secondary node (T-SN), an addition request message to allocate resources for a user equipment (UE) in a handover;

receiving an addition request acknowledgement message from the T-SN, wherein the addition request acknowledgement message comprises an indication that the T-SN applied a full radio resource control (RRC) context or a delta RRC context, wherein the delta RRC context comprises data that is updated relative to data in a UE context;

sending, to the UE, an RRC connection reconfiguration message that includes a flag indicating to release a previous EN-DC configuration and to apply the full RRC context;

receiving, from the UE, an RRC connection reconfiguration complete message; and responsive to a target master node being able to process a MCG configuration portion of the UE context and the T-SN not being able to process an SCG configuration portion of the UE context, releasing the delta RRC context corresponding to the MCG configuration portion to the target master node and the full RRC context corresponding to the SCG configuration portion to the T-SN.

4. The computer program product of claim 3, wherein the addition request message comprises a Secondary gNB (SgNB) addition request message; and wherein the addition request acknowledgement message comprises a Secondary gNB (SgNB) addition request acknowledgement message.

5. A network node for providing dual connectivity in a handover of a user equipment (UE) in a new radio telecommunications system, the network node comprising:

a non-transitory medium; and processing circuitry to execute instructions stored in the non-transitory medium to perform operations comprising:

sending, to a target secondary node (T-SN), an addition request message to allocate resources for a user equipment (UE) in a handover;

receiving an addition request acknowledgement message from the T-SN, wherein the addition request acknowledgement message comprises an indication that the T-SN applied a full radio resource control (RRC) context or a delta RRC context, wherein the delta RRC context comprises data that is updated relative to data in a UE context;

sending, to the UE, an RRC connection reconfiguration message that includes a flag indicating to release a previous EN-DC configuration and to apply the full RRC context;

receiving, from the UE, an RRC connection reconfiguration complete message; and responsive to a target master node being able to process a MCG configuration portion of the UE context and the T-SN not being able to process an SCG configuration portion of the UE context, releasing the delta RRC context corresponding to the MCG configuration portion to the target master node and the full RRC context corresponding to the SCG configuration portion to the T-SN.

6. The network node of claim 5, wherein the addition request message comprises a Secondary gNB (SgNB) addition request message; and wherein the addition request acknowledgement message comprises a Secondary gNB (SgNB) addition request acknowledgement message.

* * * * *